Figure 11:
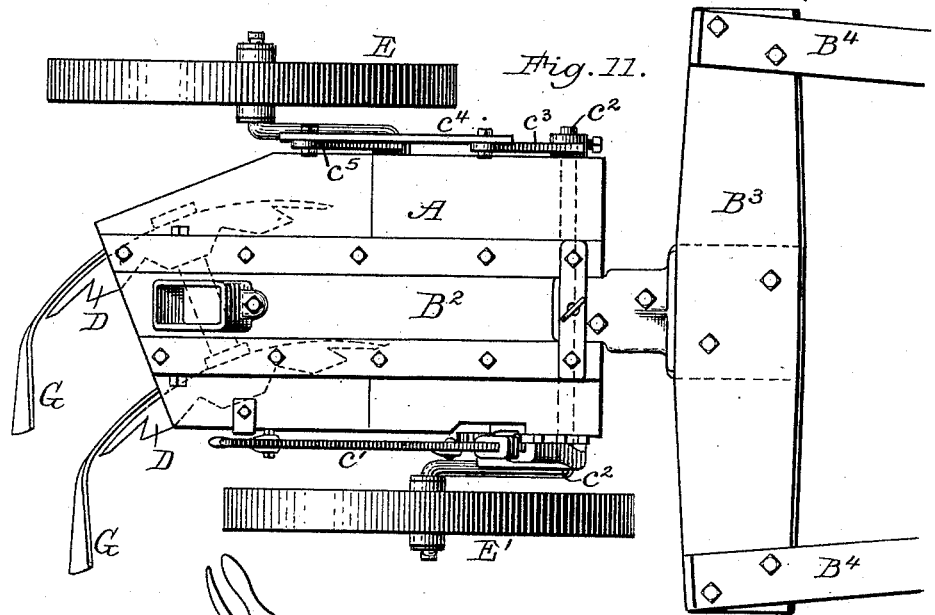

(No Model.)  6 Sheets—Sheet 1.
G. M. CLARK.
LAND PLOWING MACHINE.
No. 466,772.  Patented Jan. 12, 1892.
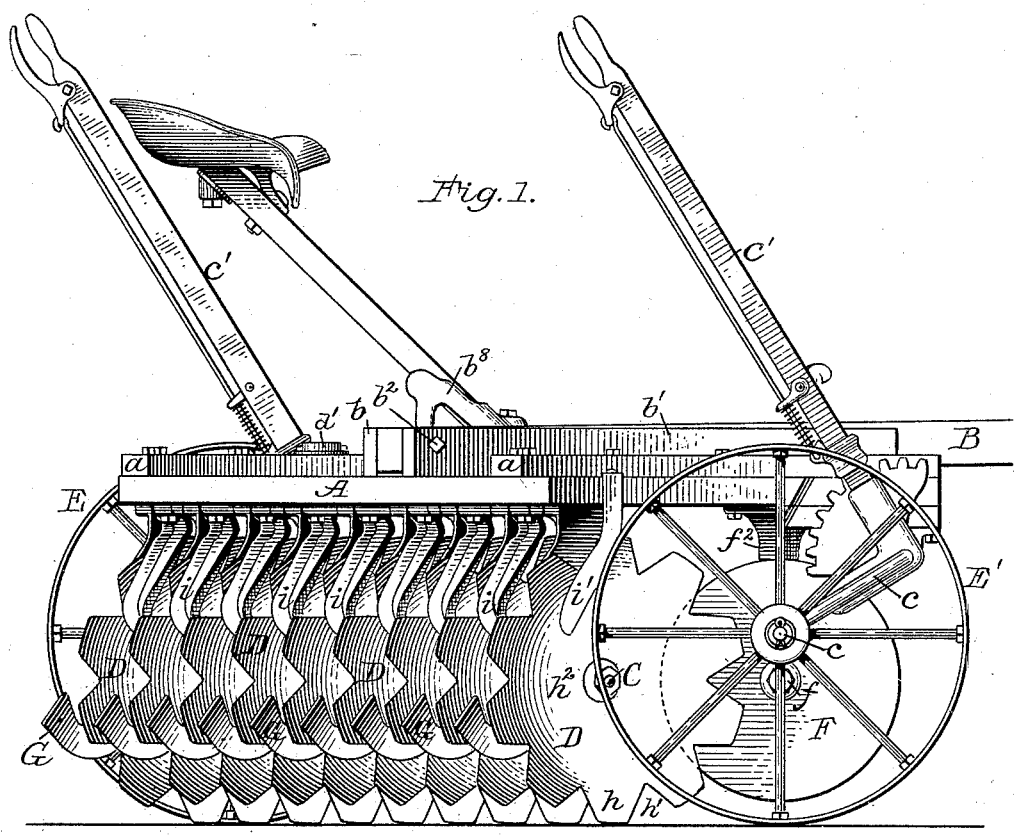
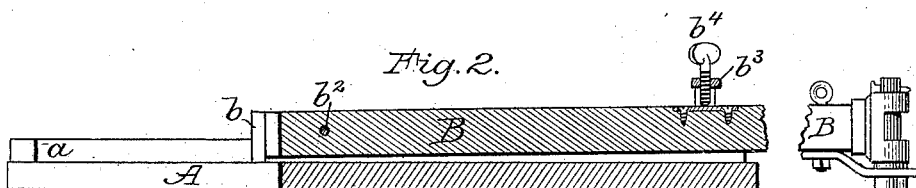
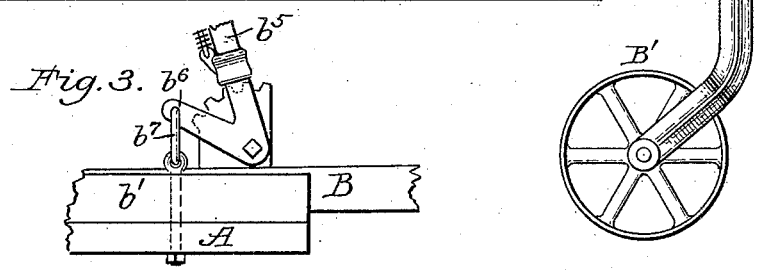
Attest:
Philip F. Larner
Howell Battle
Inventor:
George Marshall Clark
By [attorney signature] Attorney
THE NORRIS PETERS CO., PHOTO-LITHO., WASHINGTON, D. C.

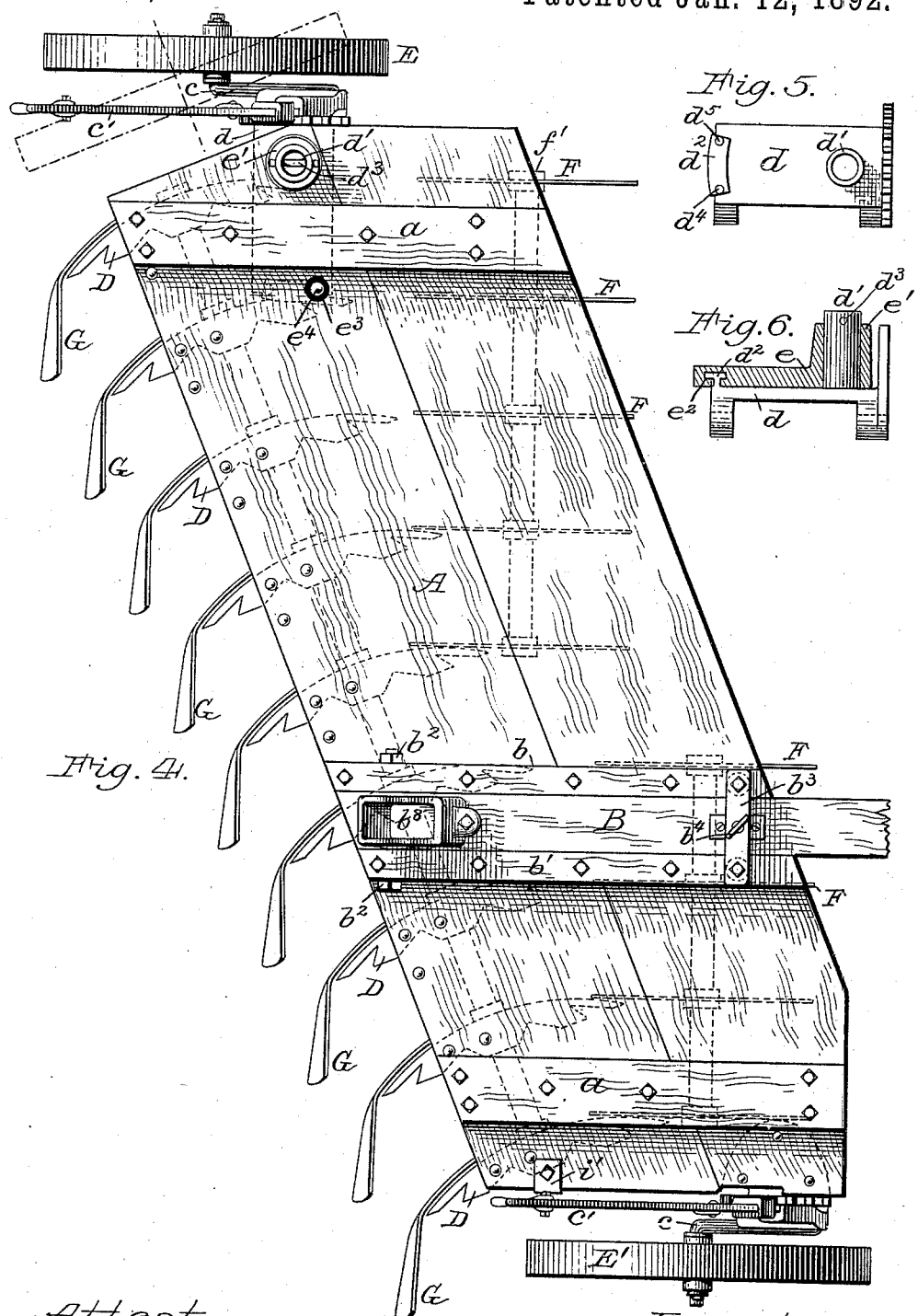

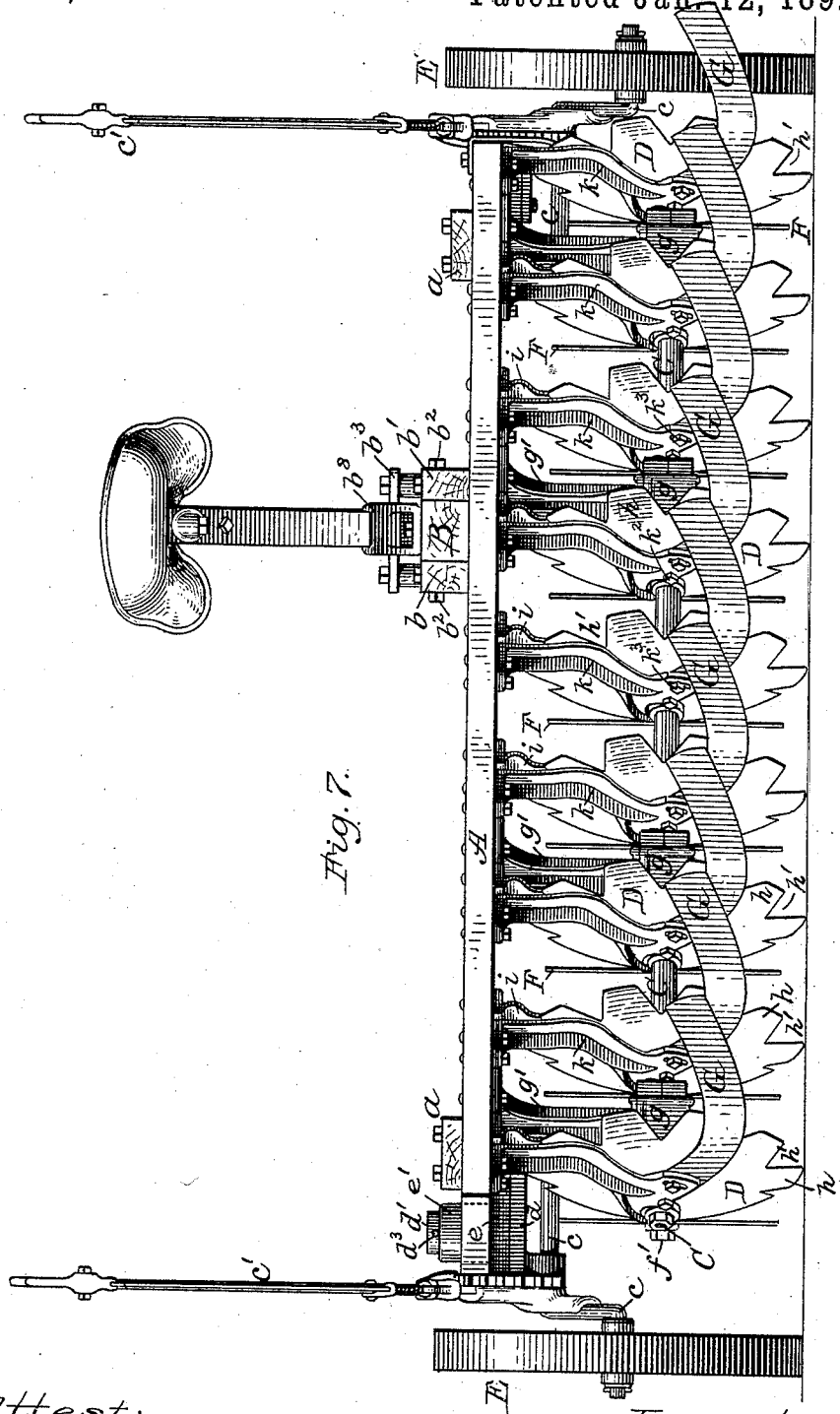

(No Model.)  6 Sheets—Sheet 4.
G. M. CLARK.
LAND PLOWING MACHINE.
No. 466,772.  Patented Jan. 12, 1892.
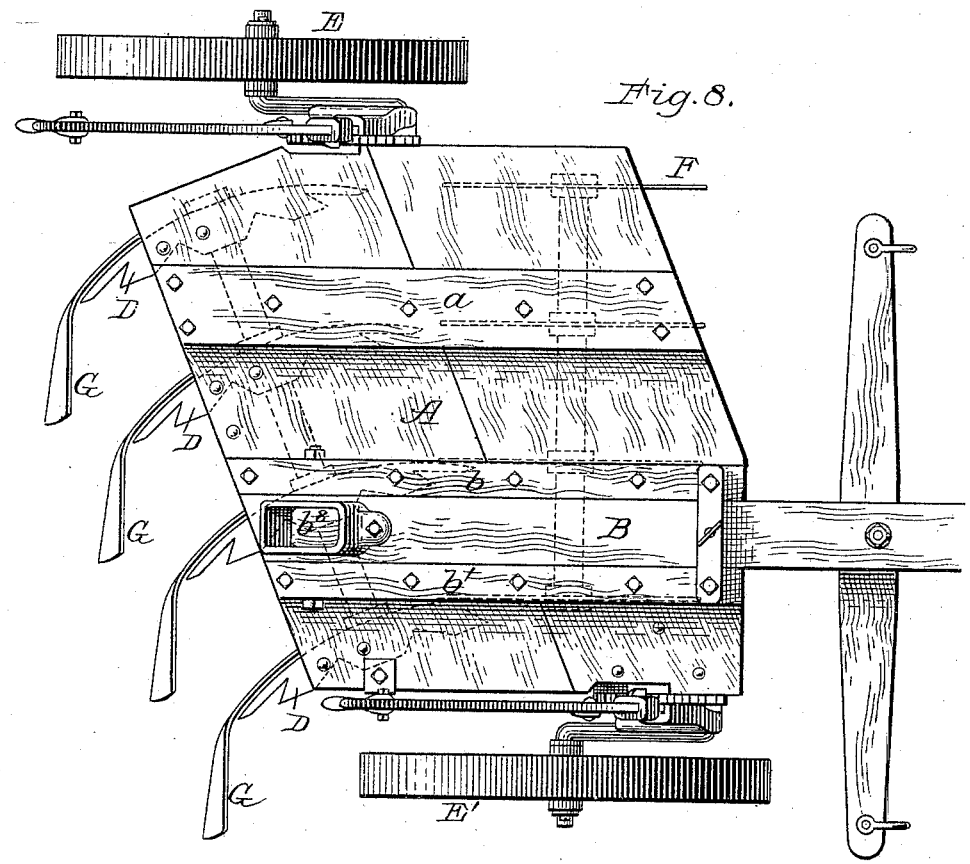
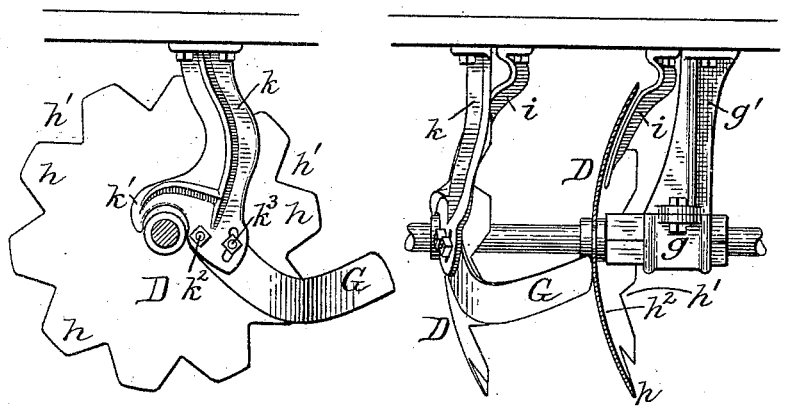
Attest:
Philip F. Larner
Howell Bartle
Inventor:
George Marshall Clark
By Wm C. Wood
Attorney (No Model.) 6 Sheets—Sheet 5.

G. M. CLARK.
LAND PLOWING MACHINE.

No. 466,772. Patented Jan. 12, 1892.

Attest:
Philip F. Larner
Howell Bartle

Inventor:
George Marshall Clark
By Wm C Mrd
Attorney (No Model.) 6 Sheets—Sheet 6.
G. M. CLARK.
LAND PLOWING MACHINE.
No. 466,772. Patented Jan. 12, 1892.
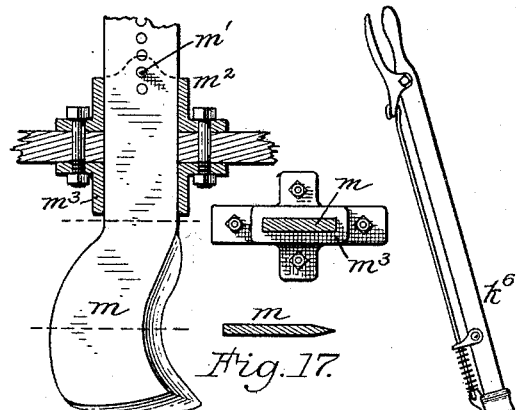
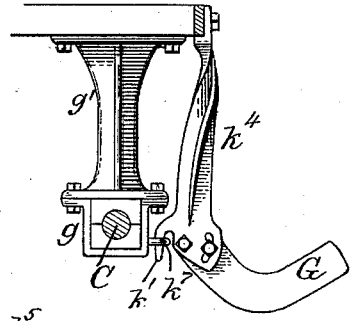
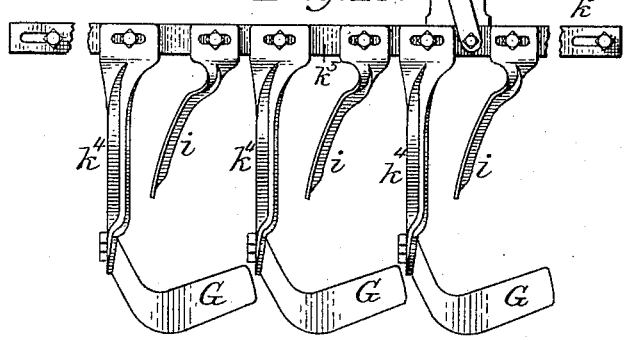
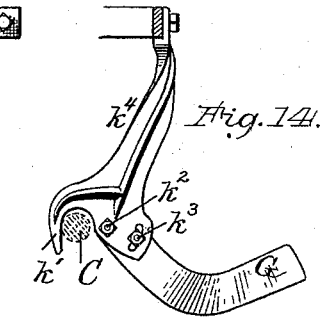
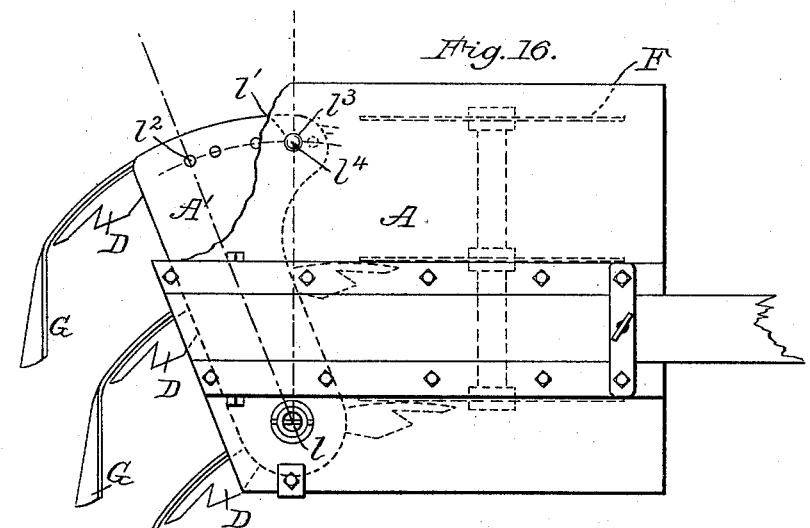
Attest:
Philip F. Larner
Howell Bartt
Inventor:
George Marshall Clark.
By Wm C Mud
Attorney

UNITED STATES PATENT OFFICE.

GEORGE MARSHALL CLARK, OF HIGGANUM, CONNECTICUT, ASSIGNOR TO CLEMENT S. HUBBARD, OF SAME PLACE.

LAND-PLOWING MACHINE.

SPECIFICATION forming part of Letters Patent No. 466,772, dated January 12, 1892.

Application filed January 14, 1891. Serial No. 377,701. (No model.)

*To all whom it may concern:*

Be it known that I, GEORGE MARSHALL CLARK, of Higganum, in the town of Haddam, county of Middlesex, and State of Connecticut, have invented certain new and useful Improvements in Land-Plowing Machines; and I do hereby declare that the following specification, taken in connection with the drawings furnished and forming a part of the same, is a clear, true, and complete description of my invention.

I believe it will be generally conceded that plows of ordinary form embodying in a substantially solid structure a plow nose or point, a landside, and a mold-board afford a general standard for comparison with other types of plowing-machines, not only as to deep work and well-turned furrows, but also as to the working power involved in their use and speed in execution. As compared with said ordinary plows, those having revolving mold-boards would apparently be capable of equally good work with some apparent reduction in soil friction and a proportionate economy in power, and also with corresponding speedier execution; but nevertheless such plows are seldom seen in service. Another distinct type of plows embody rotary shares, which, while more or less varied in form, may be generally described as circular concavo-convex shares mounted on axes which are oblique or inclined to the line of draft, so as to present their concave sides obliquely toward the front of the plow. Rotary plowshares, broadly considered, should operate with less soil friction than a plow having a revolving mold-board, an ordinary share-point, and a landside, and therefore require to a corresponding degree less power for working them. I believe, however, that I am warranted in asserting that, as compared with ordinary plows, no rotary share-plows as heretofore constructed and organized do or can equal them in the character or quality of plowing, especially in the matter of depth of cut or in the turning of soil or sod bottom up, as is deemed essential in plowing as distinguished from the operation of harrowing. The width of a cut made by a rotary share depends upon the degree of angular adjustment, and the wider the cut the greater will be the power required for working the share, with a corresponding tendency to shallow working.

The object of my invention is to produce a machine which will plow as deeply as and even deeper than any prior furrow-turning plow known to me, and to as thoroughly turn furrows of sod and soil and to more thoroughly break and disintegrate the soil, as well as to enable plowing operations to be performed with the expenditure of less power and with a proportionate greater rapidity in execution. I have attained these ends because I have, as I believe for the first time, devised and organized certain co-operating earth-working elements or devices, and in their best forms my machines contain one or more complete plows, each embodying earth-working devices in combination, as follows: first, a rotary plowshare mounted on an axis inclined to the line of draft; second, a mold-board located at the rear of the rotary share and projecting laterally beyond its rear working edge at such a height above the lower working edge of the share that it will receive edgewise-lifted soil or sod and turn it over bottom upward; third, a colter which divides soil or sod on a line corresponding with the line of draft and which does not and cannot depart from said line, and is thereby enabled to serve as a "landside" for confining the machine in its progress to a straight line, the path of said colter being in front of the rotary share.

In order that the main feature of my invention as thus stated may have its status clearly defined with reference to the prior art in plowing-machines, I will state that colters of various kinds, both fixed and rotary, have been heretofore employed in connection with ordinary plows (having a landside and a share with a nose-point and mold-board) for making initial cuts in soil or sod. Colters have also been used in connection with rotary concave disk shares for the purpose of making initial cuts and also to serve as landsides for resisting the lateral thrusts of the angularly-mounted shares. In my organization the colter performs this double duty, and hence it may be varied in form and in its mode of operation so long as it has a line-cutting capacity and is also of such form and has such strength as to enable it to effectively perform landside duty. This latter duty is the most important, and if a separate landside device be employed then the colter may be a mere cutter, and in certain forms of my machine they may be dispensed with.

As to rotary shares, I will state that while I obtain the best results by the use of certain special forms thereof other well-known forms may be employed with more or less satisfactory results without departure from certain features of my invention. When organized, however, as by me, the rotary shares are so arranged angularly to the line of draft as to secure, first, a required depth of cut, and, secondly, the mere displacement and lifting of the soil or sod in an edgewise mass to its maximum height above the bottom of the furrow with or without causing a slight turning action at the top or crest of the uplifted mass.

In my numerous experiments I have never succeeded in cutting and turning a furrow, as in actual plowing, solely by means of a rotary share (with or without a colter) however abruptly the angular adjustment of the share might be or however deep its concavity. In the use of deeply-concave shares set with their concave faces well toward the front of the plow a large expenditure of power is necessarily involved, and although the soil may be well lifted it will, if at all compact or clingy, roll backward into the furrowed path of the share. I not only employ rotary shares which have comparatively little concavity, but I also set them at such an angle as will enable them to cut as deeply as and generally much deeper than an ordinary plow and also deeper than the cut made by the colters. In their best form my rotary shares have working edges which are in substance a series of sharp-edged broad spade-blades, and these, with intervening spaces, enable a share to make a much deeper and more effective cut than is possible with a plain-edged rotary share. In other words, my rotary shares are specially constructed and organized with reference to making deep cuts in the soil and with no more lateral dragging, scraping, or displacing effect than is necessary for elevating the top edge or crest of the displaced and lifted soil to its maximum height, thus enabling the share to be operated without an undue expenditure of power and with corresponding rapidity in execution. My moldboard at the rear of the share engages with the upper portion of the edgewise-lifted soil and turns it over, bottom up; but, unlike the mold-board of an ordinary plow, it also breaks and effectively disintegrates the turned soil, and I know of no prior instance in which a true furrow-turning mold-board has been organized to co-operate with a rotary plowshare. I deem it proper, however, to state that long after I had completed my invention and applied it to actual service I became cognizant of the fact that rotary concavo-convex plowshares had been disclosed in connection with scrapers operating within their working faces, (after the manner of such scrapers as had long before been used on disk harrows,) and that in certain Letters Patent said scrapers were described as made to "approximate to the form of mold-boards, instead of in the form of mere scrapers," so that in case the soil should cling to the disks it would not only be scraped off, but "turned as by means of the ordinary mold-board." In said prior-described plow the rotary shares could be in no manner aided in the turning of furrows, except so far as keeping the share clean on its working face might be conducive to that end, whereas in my machine the turning of a furrow depends upon the mold-board, and said boards perform no share-scraping function, each share being provided with its own scraper as an element separate and distinct from the mold-board. I have also since the completion of my invention become cognizant of certain other Letters Patent wherein for an alleged successful assisting of a rotary share to turn furrows of sod, &c., certain horizontal cutting disks or blades are shown and described for operation in the plane of the bottom of a furrow with a view to undercutting the sod simultaneously with the action of the rotary share. Said prior disks could in no manner operate as my mold-boards do, because whatever service said disks might perform would be underground work, whereas my mold-boards are essentially surface-workers. When a concavo-convex rotary share has its axis at right angles to the line of draft, it cuts but little into the soil. It is equally true that when the axis of a share is set unduly obliquely the share will not revolve, but operate as a mere gouging-scraper. It is also true that if the share be set so as to enable it to make the deepest possible cut it will rotate quite freely, and it is this operation that I seek, and my shares can and do so operate, because the mold-boards perform the entire turning duty, each share only displacing a mass of soil and setting it up edgewise, and therefore my mold-boards enable the shares to cut more deeply and to be operated with less power than if they were more abruptly set and were relied upon for attempts at furrow-turning service. In no prior plow known to me does the presence of a mold-board assist or modify the deep-cutting operation of the plowshare. My mold-board is not and need not be engaged by the soil or sod until after the latter has been fully lifted, and hence the soil is in a more or less broken condition, easily tipped over, and further broken and disintegrated by the mold-board without an undue expenditure of power, and although for securing the best results the mold-board is a thin metal plate or blade it may be of disk form and rotative without departure from certain portions of my invention.

It will now be understood that the combination of a rotary share and a mold-board at the rear thereof and the two co-operating as described constitute an important feature of my invention, both with and without a colter as a third element, in combination with the rotary share and mold-board. If, however, no coulter be employed, then the sidewise thrust of the shares will be resisted by any device which will do landside duty—as, for instance, one or more wheels provided with a sharp flange or with teeth, as heretofore, for penetrating the soil—and it is immaterial then whether these wheels be in front of the shares or at the one proper side thereof. The colters as used by me, however, operate in a peculiar way, in that they facilitate deep cutting by the shares. In an ordinary plow the colter merely makes an initial cut, and to that extent it facilitates the progress of the plow without enabling it to cut any deeper than it would or could cut without a colter. In my machine the rotary share will penetrate much below the bottom of the cut made by the colter, and the depth of cut made by the share will as a rule, (or at least often,) depend largely upon how far the share may have been aided by the preliminary cutting performed by the colter, especially in the presence of undue quantities of weeds, roots, &c.

Colters in combination with rotary shares have been for many years disclosed in various Letters Patent; but I know of none which were devised with special reference to enabling a colter to cut as deeply as it possibly could, and then causing the rotary share to cut still deeper.

I have organized my machines as gang-plows, and these are provided with a frame and a pole or thills, and, as a rule, with carrying-wheels, accompanied with various means for convenient and effective adjustments, and said machines involve certain novel features in construction and combination, all of which, after a description thereof in detail, will be duly specified in appropriate clauses of claim hereunto annexed.

Figure 12:
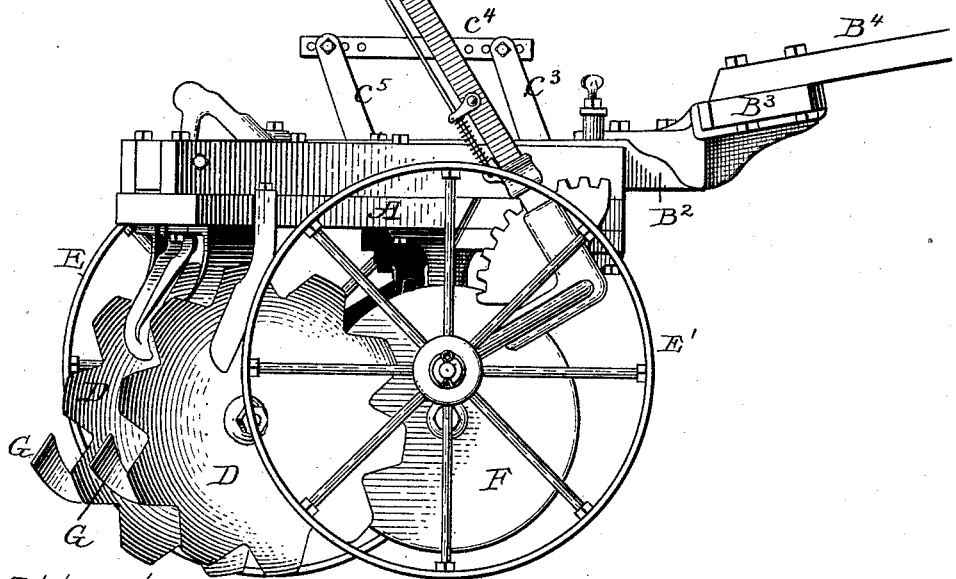

Referring to the drawings, Figure 1 illustrates in side elevation one of my largest machines embodying nine plows. Fig. 2 illustrates the attachment of the pole to the frame and an arrangement for adjusting the colters, the pole being broken away for a portion of its length for bringing in its outer end with its supporting caster-wheel. Fig. 3 illustrates other mechanism for adjusting the colters. Fig. 4 is a top or plan view of the machine. Figs. 5 and 6 illustrate details in connection with the land supporting-wheel. Fig. 7 is a rear end view of the machine. Fig. 8 illustrates in plan view a four-plow machine. Fig. 9 illustrates one of the rotary plow shares and its mold-board in rear side view. Fig. 10 illustrates a mold-board and plowshare in rear edge view, and also a plowshare in section, for better showing the scraper employed therewith. Figs. 11 and 12 illustrate in plan and side view one of my machines embodying two plows and adapted for use with one horse. Figs. 13, 14, and 15 illustrate the mold-boards and the scrapers when arranged to be moved to and fro by means of a hand-lever. Fig. 16 illustrates one of my three-plow machines as organized without carrying-wheels. Fig. 17 illustrates a knife-colter adapted to also perform landside duty.

I will first describe the large gang-plow, Figs. 1 to 7, inclusive; but preliminary thereto I will state that this machine was specially devised for service on the Pacific Slope, and that several of them have been successfully employed in plowing under the various peculiar conditions incident to that general locality.

The frame of this machine consists, mainly, of a strong platform A, composed of heavy plank and suitable brace-pieces $a$, firmly bolted across the top. The frame A has on its upper side a pair of hounds $b\ b'$, firmly bolted in place, and between them a draft-pole B is mounted, its rear end being pivoted to the hounds, as at $b^2$, near the adjacent portion of the rear edge of the frame, thus confining the pole against lateral vibration, because the frame is set angularly to the pole or line of draft to a degree corresponding to the oblique line of the shaft C, on which the rotary plowshares D are mounted. The form and construction of the frame may be widely varied without departure from certain portions of my invention.

This machine is provided with two carrying-wheels E and E', each of which is axially mounted on a pivotal bent axle-stud $c$, firmly attached to a controlling-lever $c'$, having a segmental notched plate and a pawl, in a manner well known for varying the relations between the axes of the wheels and the frame and enabling the plows to be wholly lifted above the tread of the wheels, as when moving the machine while out of service. The land-wheel E is so remote from and so far rearward with relation to the furrow-wheel E' that changes in direction would involve heavy strains on the land-wheel and its axial stud if the latter were always maintained in a position parallel with the axial stud of the furrow-wheel. To enable the machine to be easily turned and to obviate these strains and the consequent liability of breakage, the axle-stud $c$ of the land-wheel E is mounted in or on a swiveled block $d$, having near its front end a large vertical pivot $d'$ and at its rear end a horizontal segmental or curved guide-piece $d^2$. A heavy bolster-block $e$ is bolted securely to the under side of the frame. Said bolster-block has a vertical tubular hub $e'$, extending through the platform, for the reception of the pivot $d'$ of the swiveled block $d$, said pivot having a lateral hole near its top for the reception of a retaining-pin $d^3$. At the under side of the bolster-block, Figs. 5 and 6, at its inner end, there is an open and laterally-recessed curved groove, as at $e^2$, in which a portion of the guide-piece $d^2$ of the block $d$ is freely fitted, (after the manner of a dovetail slide,) thus providing for the swiveling of the axle-stud on the pivot $d'$. At the inner corner of the bolster-block there is a vertical hole and a corresponding hole $e^3$ in the platform above. At the rear end of the swiveled block $d$ there are two vertical holes $d^4$ and $d^5$ at the two ends of the guide-piece. With a locking-pin $e^4$ in the holes $e^3$ and $d^4$ the wheel E will be adjusted for plowing, as shown in Fig. 4; but on removing the locking-pin and swinging the wheel backward, as indicated in dotted lines, the hole $d^5$ in the swiveled block $d$ will register with the hole $e^3$, and then upon inserting the locking-pin the machine can be easily and safely turned upon the tread of the furrow-wheel E', and after a corner has been turned the normal adjustment of the wheel will be resumed.

In this machine there are nine revolving colters F. In order that the frame-platform need not be of undue proportions, the colters are divided into two gangs, one of four on shaft $f$ and the other of five on shaft $f'$, these shafts being at right angles to the line of draft and in different vertical planes, one being rearward of the other. These shafts are provided with suitable boxes and hangers $f^2$, securely bolted to the under side of the frame-platform A.

The nine revolving plowshares D are mounted on one shaft or axle C, which is provided with suitable boxes $g$ and hangers $g'$, securely bolted to the under side of the frame-platform A. The shaft C is inclined to the line of draft to such a degree as will secure in each share the desired maximum deep-cutting and soil-lifting capacity. The plowshares in this machine are about eighteen inches in diameter (in some machines twenty-four inches) and are concavo-convex, and the concave faces are, as usual, turned toward the front; but their angularity is so slight that each rotates readily and cuts deeply and by the lateral sweeping movement of the lower or working edge lifts the mass of displaced soil or sod into a substantially vertical or edgewise position. As here shown, the shaft C is inclined about twenty-two degrees from a line at right angles to the line of draft, and although this inclination may be varied it need not be for securing the requisite deep-cutting and soil-lifting capacities, because with this machine a depth of cut of six inches and even more can be readily attained. These plowshares are notched at their peripheries, as shown at $h'$, affording intervening spade-like portions $h$ and an interior earth-working face $h^2$. These plowshares have also well-sharpened edges, and they are similar to those disclosed in my Letters Patent No. 369,163. Plain-edged rotary plowshares (or disks) may be relied upon for fairly good service, and although I do not preclude the use thereof in connection with certain features of my invention these V-notched plowshares will afford the deepest cutting and much better soil working than the plain disks, and the sharp-edged blades and the V shape of the notches are conducive to a thorough cutting of roots and weeds and an avoidance of entanglement therewith. As here shown, these plowshares are solid steel-plate disks; but some of my machines have composite shares made up of several pieces, it being quite immaterial to their operation in a general way how they may be constructed, provided they are adapted to cut deeply and to lift a displaced mass of soil edgewise in front of the rear portion of the share. It is to be understood that for use in certain soils it will be desirable that the plowshares should be separated by considerably less space than I have indicated; but if eighteen-inch shares be about eight inches apart the plow will be well adapted for general service.

As heretofore in disk harrows, it is important in rotary plows to keep the concave faces of the plowshares free from adhering soil, and therefore each disk has a suitable scraper $i$ (fully shown in Figs. 10 and 13, and also as fully as is practicable in Figs. 1 and 7.) As shown in Fig. 1, the end scraper at $i'$ is slightly unlike the others and is mounted on the end of the frame.

As clearly indicated, the path of each colter F is in line with its appropriate share D, the front working edge of the latter practically occupying the cut made by the colter; but the latter by making the preliminary cutting of soil, sod, and trash enables the plowshares to cut more deeply than they would if they had all the cutting work to do, and said colters also serve as landsides for enabling the machine to resist the lateral displacing tendency of the plowshares. These plowshares and colters in my machines serve solely for putting the soil and sod into such a condition and into such a position that it may be turned bottom up by the mold-boards G, and without the latter the colters and plowshares would not operate as true plows, but merely as soil-working devices after the manner of disk harrows and without any practical furrow-turning capacity. Each plowshare has at its rear working edge and projecting laterally therefrom its appropriate mold-board G. As here shown, each mold-board is a bent plate composed of steel and capable of yielding or springing under heavy strains; but the form and character of these mold-boards may be widely varied without departure from the main feature of my invention, which consists in the combination, with a rotary share, of a mold-board located at the rear of the share and so projecting laterally therefrom that its front face will be engaged by or engage with the upper portion or crest of the soil uplifted by the share and turn it over bottom up, as in ordinary plowing, but for better breaking up or disintegrating effects than is possible with the mold-boards of ordinary plows, which do not materially disturb the slicing effect of the share. These mold-boards G may also be variously mounted without departure from certain portions of my invention. In these large machines I have mounted the mold-boards in the manner specially illustrated in Figs. 9 and 10 and have found them highly satisfactory in their workings. In this instance each mold-board has its own hanger $k$ securely bolted to the under side of the frame A and provided at its front lower side with a hook $k'$, which partially embraces the hub or collar of a plowshare D, closely adjacent to its rear or convex side. The mold-board at its inner end is pivotally bolted at $k^2$ to the hanger; but the latter is slotted in the arc of a circle for the reception of a second or clamping bolt $k^3$, thus enabling the working face of the mold-board to be vertically adjusted with reference to the lower edge of the share. When thus mounted, the mold-boards are enabled to fully perform their furrow-turning functions, and they also do good service in tearing and breaking up the overturned sod and soil. The faces of the mold-boards so harmonize with the inner rear faces of the shares that the latter in their rotative progress freely discharge and deliver the uplifted sod and soil edgewise to the mold-boards and the latter assume such full control thereof as to not only completely turn the sod and soil, but leave it in a condition quite equal to that of land which has been both plowed and harrowed by ordinary methods.

It is to be distinctly understood, as hereinbefore indicated, that the mold-boards may be widely varied in width and in form without departure from my invention. They may be provided with downwardly-curved extensions, so that their lower portions near the edge of a share will be located near the bottom of the cut furrow to enable them to engage with a greater surface of the lifted soil, and so, also, may they be provided with rearwardly-curved lower edges. I have tried them in various shapes, and while some one particular form may have had special value in working some peculiar soils I have demonstrated to my satisfaction that mold-boards of the form and arrangement shown are well calculated for general use and can be relied upon for satisfactory service in all kinds of soil and under ordinary conditions.

Referring now to Figs. 1 to 7, it will be seen that the colters F are smaller in diameter than the plowshares. In this machine they are about sixteen inches in diameter, and as it is desirable that they should be adjustable for different depths of cut it is only necessary that the front portion of the platform-frame A should be raised or lowered. In heavy machines the pole B has at its outer end a caster-wheel B', Fig. 2; but in light machines this is not needed, and in either event the adjustment of the colters is effected with the pole serving as a fixed point. Two arrangements of adjusting mechanism are here illustrated. In Figs. 2 and 4 there is shown a bridge-piece or yoke $b^3$, straddling the pole from one hound $b$ to the other $b'$, and in a threaded hole in said yoke there is a thumb-screw $b^4$, which, by being turned one way or the other, lifts or lowers the front portion of the frame A. In Fig. 3 a hand-lever $b^5$, with a pawl and a segmental notched plate, is mounted on the top of the pole B, and the short arm of the lever at $b^6$ is connected to a yoke-link $b^7$, which is attached to the platform A by way of the hounds $b\ b'$. It will here be observed that in this large machine the pole is attached to the platform A between the third and fourth plows from the furrow-wheel E', leaving at the land-wheel side the other six plows. This arrangement of the pole with reference to the gang of plows affords a fairly-balanced draft, and the machine operates smoothly and is easily maintained in its proper working line. At the rear end of the pole there is a seat-socket $b^8$, enabling the weight of the driver to be applied at a point highly favorable to the operation of the plows.

In ordinary prairie work and in wheat-fields where the straw has been harvested the mold-boards, organized as already described, do not often become unduly clogged with trash; but in some cases it is important to provide means for freeing the mold-boards from masses of trash which will get clogged or wedged between the mold-boards and the adjacent portions of the plowshares. To that end, as illustrated in Figs. 13, 14, and 15, the mold-board hangers $k^4$ are attached to and pendent from a sliding bar $k^5$ at the rear edge of the frame A, and the hanger-hooks at $k'$ are longer than those before described, and they loosely engage with the shaft C. The bar $k^5$ is provided with a hand-lever $k^6$ for enabling the driver from time to time to impart a simple to-and-fro movement to the mold-boards G, which will enable the prompt release of such trash as they may have collected. Those mold-boards which are adjacent to the hangers and boxes $g$ of the plowshare-shaft C cannot of course have their hangers $k^4$ hooked over the shaft, and they are therefore hooked upon eyes or links $k^7$, secured to the hangers $g'$, as illustrated in Fig. 15, thus providing for the requisite lateral movement of the mold-boards, and this, too, without impairing their strength or their furrow-turning capacities. The scrapers $i$ are also mounted on said bar $k^5$, and this enables them to be set more or less closely toward the concave face of the plowshares, as in disk harrows, and although the plowshares are between said scrapers $i$ and the hangers $k^4$ a sufficient intervening space is provided for securing the to-and-fro movement requisite for freeing the mold-boards from adhering matter.

In Fig. 8 I show a machine having but four plows, each consisting of a colter F, a rotary share D, and a mold-board G, as before described; but the colters are all on one shaft. In this machine the land-wheel E does not require the special swiveled arrangement described in connection with the large machine. The pole B is attached to the platform-frame A between the first and second shares nearest the furrow-wheel E'; but no caster-wheel is needed on the pole. In this machine the scrapers before described are employed, and the mold-boards may be mounted upon a sliding bar, or as in Figs. 9 and 10.

In Figs. 11 and 12 I show one of my machines adapted to be worked by a single horse and well suited for use by small farmers and market-gardeners. In this machine only two plows are employed, each consisting of a colter F, rotary share D, and mold-board G, as before described. The frame A and pole-shank $B^2$ are substantially as before described. This pole-shank has a rigid cross-bar $B^3$, to which suitable thills $B^4$ are attached. The carrying-wheels E and E' are in this machine capable of being simultaneously adjusted by means of one hand-lever $c'$, which is secured to an axle-stud, which is prolonged to form a rock-shaft $c^2$, extending to the opposite side of the frame and having thereon a vertical arm $c^3$, which is coupled by a link $c^4$ to a short lever $c^5$, which is coupled to the axle-stud of the land-wheel E. The link $c^4$ has a series of holes in it for enabling a varied vertical adjustment of the treads of the two wheels or placing both in the same plane.

A direct and satisfactory comparison may be made between the operation of this machine and that of an ordinary one-horse plow. Under ordinary circumstances a horse weighing not more than ten hundred pounds can operate my two-plow machine with greater ease than when working an ordinary plow and will cover in a given time more lineal ground and plow deeper and more than twice as rapidly and leave the soil in far better condition than I believe to be possible with any ordinary plow. A machine having three of my plows worked by a horse weighing twelve hundred pounds and upward can cover as much or more lineal ground in a given time and with greater ease than with an ordinary plow.

With one of my four-plow machines a pair of quick-moving light horses can plow an acre of land in less than one-fourth of the time required when operating with an ordinary plow, and the work can be performed in a far more satisfactory manner as to depth of cut, turning the furrows, and breaking up the sod and soil, and with such a team much more lineal ground can be covered in a given time than with the ordinary plow and with less wearing strain on the team. With a pair of heavy horses well trained to the service and a four-plow machine an acre of ordinary meadow-land can be plowed in a thoroughly-satisfactory manner in less than one-half of the time required by the same horses for doing the same work with two ordinary plows. The large nine-plow machine can be readily worked with four horses; but in breaking up well packed and baked soil or prairie land larger teams will be required.

While I prefer, as a rule, to employ supporting-wheels for conveniently adapting the machines to wide ranges of service, I have dispensed with such wheels in some machines, but provided for an adjustment of the plowshare shaft from its angular to a right line position, as illustrated in Fig. 16.

In this machine three plows are employed, each consisting of a rotary share D, a mold-board G, and a colter F; but instead of all being directly attached to one platform-frame the colter-shaft only is directly secured to the platform-frame A, to which the pole or a pole-shank is attached, as before described. The plowshares, scrapers, and mold-boards have hangers, as before described; but they are secured to the under side of a heavy plate or to a plank A', which is strongly pivoted, as at $l$, near one end and provided with several holes at the opposite end, so that when, for instance, the holes $l'$ $l^2$, respectively, register with a hole $l^3$ in the frame A a locking-pin $l^4$ will secure the plate A' and the plowshares either in a working position or with the plowshare shaft or axle at right angles to the line of draft, as when the machine is to be trundled from place to place.

Although the revolving colter is capable of performing the most satisfactory service and with the expenditure of the least power, it is to be understood that a non-rotative knife-edged colter may be employed, as illustrated in Fig. 17.

The blade $m$ must have considerable width and be sufficiently stiff and strong to enable it to perform landside duty, and its shank is perforated for the reception of an adjusting and locking pin, as at $m'$, thus providing for varied depths of cut. Sockets $m^2$ $m^3$ above and below the frame A afford desired rigidity for the colter.

In small machines this knife-colter can often be employed to good advantage, especially in plowing garden-land comparatively free from litter and sod, it being often the case that when only landside duty is required from the colters one of them will serve for two or more plows, and especially when comparatively shallow plowing is desired, thus reducing the expended draft-power to a minimum.

It will be obvious that one of my machines having a single plow can be relied upon for cutting and turning a single furrow if it be provided with supporting-wheels; but such an organization would involve but little, if any, economy in use for regular plowing, inasmuch as an ordinary horse or mule can easily operate at least two plows. It is to be understood, however, that such single-plow machines will involve valuable portions of my invention and that they can be used to good advantage in making to-and-fro furrows and cross-furrows, as for hilling the soil in rows or in squares, whenever required. It will also be obvious that another form of my machines will require for its perfect operation no landside—as, for instance, for performing certain special lines of service one rotary plowshare may serve as a landside for another share, the two being mounted on axles which are reversely inclined after the manner of the disks in ordinary gang disk harrows. Each plowshare having its own mold-board will enable the two plows or two gangs of plows to operate as already described; but the plowed field would be worked in strips equal in width to the space covered by the two gangs and separated by an open cut, or, in other words, an uncovered furrow.

Inasmuch as this form of my machine requires no landsides as separate elements, it follows that colters need not be used for landside duty, or at all, except for specially-deep cutting, and also that supporting-wheels may also be dispensed with, because then the gangs of plows are capable of right-angled adjustment, as illustrated in Fig. 16.

It will, however, be understood that supporting-wheels will always be serviceable for limiting depth of cut under such circumstances as would render specially-deep plowing unnecessary or undesirable.

Having thus described my invention, I claim and desire to secure by Letters Patent—

1. In a plowing-machine, the combination, substantially as hereinbefore described, of a rotary plowshare mounted upon an axis inclined to the line of draft for cutting into soil or sod and laterally lifting a mass of the same edgewise to a substantially vertical position, and a mold-board located at the rear of and projecting laterally beyond the rear edge of the share for receiving, turning over, breaking up, and leveling the mass of lifted soil delivered thereto by the rotary plowshare.

2. In a plowing-machine, the combination, substantially as hereinbefore described, of a rotary plowshare mounted on an axis inclined to the line of draft and having a notched periphery affording a series of flat spade-like blades for enabling the share to cut deeply into the soil, and a mold-board located at the rear of and projecting laterally beyond the rear edge of the share for receiving and turning over the mass of soil or sod lifted edgewise by the share.

3. In a plowing-machine, the combination, substantially as hereinbefore described, of a rotary plowshare and a vertically-adjustable mold-board located at the rear of the share and laterally projecting therefrom.

4. In a plowing-machine, the combination, substantially as hereinbefore described, of a rotary plowshare and a flexibly-mounted mold-board at the rear of said share and laterally projecting therefrom.

5. In a plowing-machine, the combination, substantially as hereinbefore described, of three earth-working elements co-operating as one plow, as follows: a colter which cuts or divides the soil or sod on a line corresponding with the line of draft and also restricts the machine to a straight-line movement, a revolving plowshare at the rear of the colter, which is mounted on an axis inclined to the line of draft and has its front working edge substantially in line with the path of the colter, and a furrow-turning mold-board located at the rear of the rotary share and projecting laterally beyond its rear working edge, whereby the colter will define the path of the share and restrict it thereto and enable the rotary share to cut as deep as or deeper than the colter and to lift the soil or sod in an edgewise mass into a substantially vertical plane, and also whereby the mold-board on receiving or engaging with the lifted mass will then turn it over for completing the furrow and for breaking up and leveling the turned sod and soil.

6. In a plowing-machine, the combination, substantially as hereinbefore described, of three co-operating earth-working elements, as follows: a revolving colter restricted to the line of draft in its soil-and-sod-cutting action, a revolving plowshare at the rear of the colter on an axis inclined to the line of draft and having its front working edge substantially in line with the path of the colter, and a mold-board located at the rear of the rotary share and projecting laterally beyond its rear working edge.

7. In a plowing-machine, the combination, substantially as hereinbefore described, of three earth-working elements co-operating as one plow, as follows: a colter which makes a straight-line cut in the soil and restricts the path of the machine to the line of draft, a plowshare rotative on an axis inclined to the line of draft and having at its periphery earth-working portions separated by spaces which enable the share to readily and deeply penetrate the soil, and a mold-board at the rear of the share for receiving soil and sod lifted edgewise by the share and turning it over away therefrom and breaking it up and leveling the surface of the plowed soil.

8. In a plowing-machine, the combination, substantially as hereinbefore described, of a frame, wheels by which said frame is carried, means for varying the height at which said frame is carried and also for locating the axes of the wheels in different horizontal planes, several colters attached to and below the front portion of said frame and restricted to operation in lines parallel with or corresponding to the line of draft, several rotary plowshares attached to said frame with their axes inclined to the line of draft and having the front working edge of each share substantially in line with its appropriate colter, and several mold-boards depending from said frame, each at the rear of its appropriate share and projecting laterally beyond its edge, for receiving soil turned edgewise by the share and turning it over for completing a furrow.

9. In a plowing-machine, the combination, substantially as hereinbefore described, of several colters which restrict the machine to straight-line movements, several rotary plowshares at the rear of the colters on axes inclined to the line of draft, several mold-boards, each at the rear of its appropriate plowshare, a platform or frame to which said colters, shares, and mold-boards are attached, a draft-pole hinged to said frame or platform near the rear edge thereof and restricted against lateral movement, and means for vertically adjusting the front edge of the frame and varying the deep-cutting capacity of the colters.

10. In a plowing-machine, the combination, substantially as hereinbefore described, of a gang of rotary plowshares on one shaft inclined to the line of draft, a mold-board at the rear of each share and laterally projecting therefrom, and two gangs of revolving colters on different shafts, which are in different vertical planes, but at right angles to the line of draft, and with each colter substantially in line with the working edge of its appropriate plowshare.

11. In a plowing-machine, the combination, substantially as hereinbefore described, of a frame, a gang of rotary plowshares carried by said frame, and a pair of separately-mounted supporting-wheels provided with means for varying the height at which said frame may be carried and also with means, substantially as described, for varying the axial line of one of said wheels, whereby in changing direction said wheel may be swung laterally for enabling it to travel in a curved path without unduly straining it or its axle-stud.

12. In a plowing-machine, the combination, substantially as hereinbefore described, of a gang of rotary plowshares, a gang of mold-boards, and means for moving said boards to and fro in a horizontal plane at the rear of the plowshares.

13. In a plowing-machine, the combination, substantially as hereinbefore described, of a gang of rotary plowshares, a gang of mold-boards at the rear of said shares, a sliding bar to which said mold-boards are connected, and a lever for moving said mold-boards to and fro.

14. In a plowing-machine, the combination, substantially as hereinbefore described, of a gang of rotary plowshares, a gang of mold-boards at the rear of said shares, a scraper for each share, a sliding bar connected with said mold-boards and also carrying the scrapers, and a lever for moving said bar and imparting a to-and-fro movement to the mold-boards and scrapers.

GEORGE MARSHALL CLARK.

Witnesses:
PHILIP F. LARNER,
HOWELL BARTLE.